Aug. 28, 1956 R. H. WITT 2,760,325
COTTON STRIPPER WITH PNEUMATIC CONVEYING MEANS
Filed Dec. 18, 1953 5 Sheets-Sheet 1
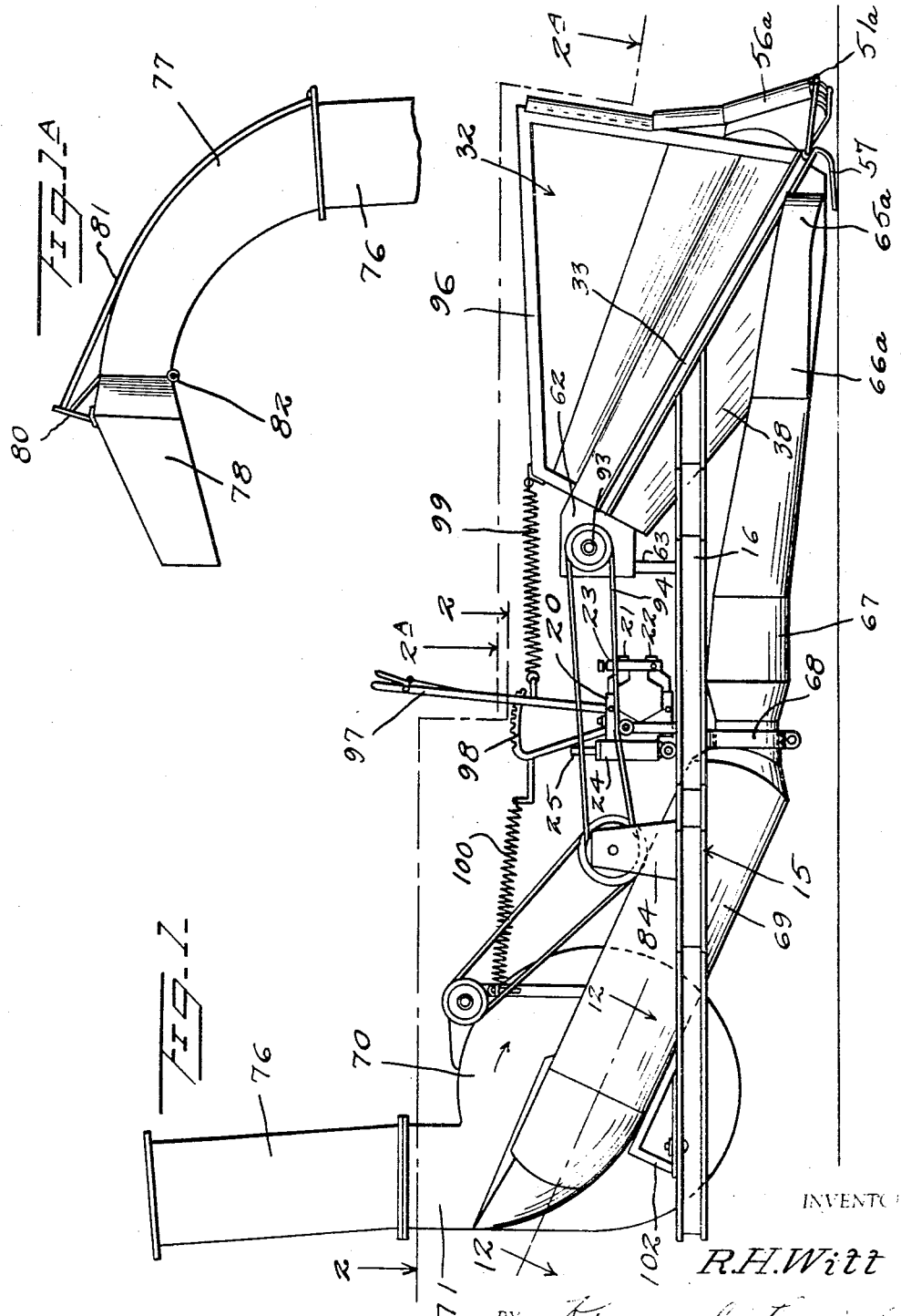
INVENTOR
R. H. Witt
BY Kimmel & Crowell
ATTORNEYS

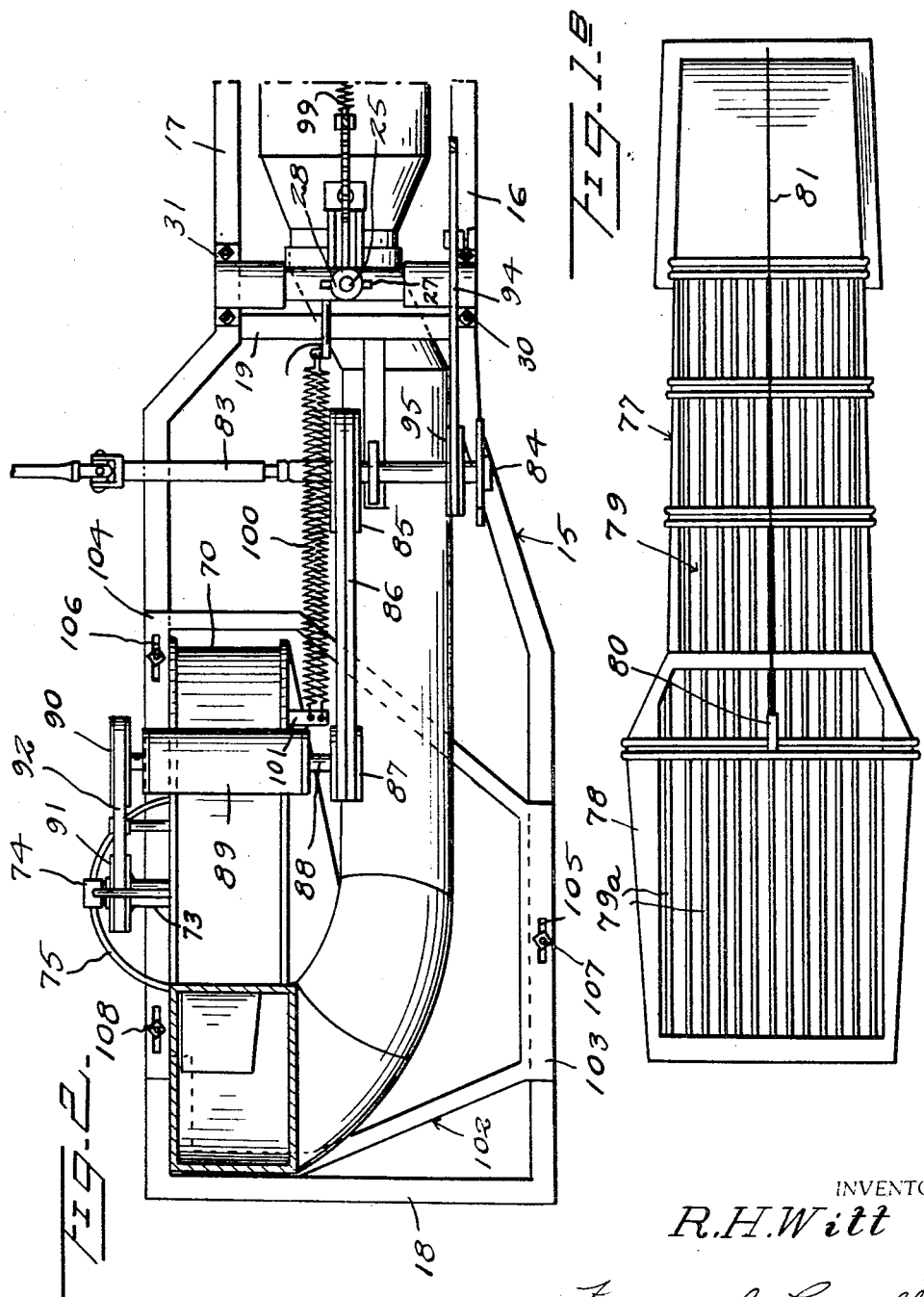

Aug. 28, 1956   R. H. WITT   2,760,325
COTTON STRIPPER WITH PNEUMATIC CONVEYING MEANS
Filed Dec. 18, 1953   5 Sheets-Sheet 3
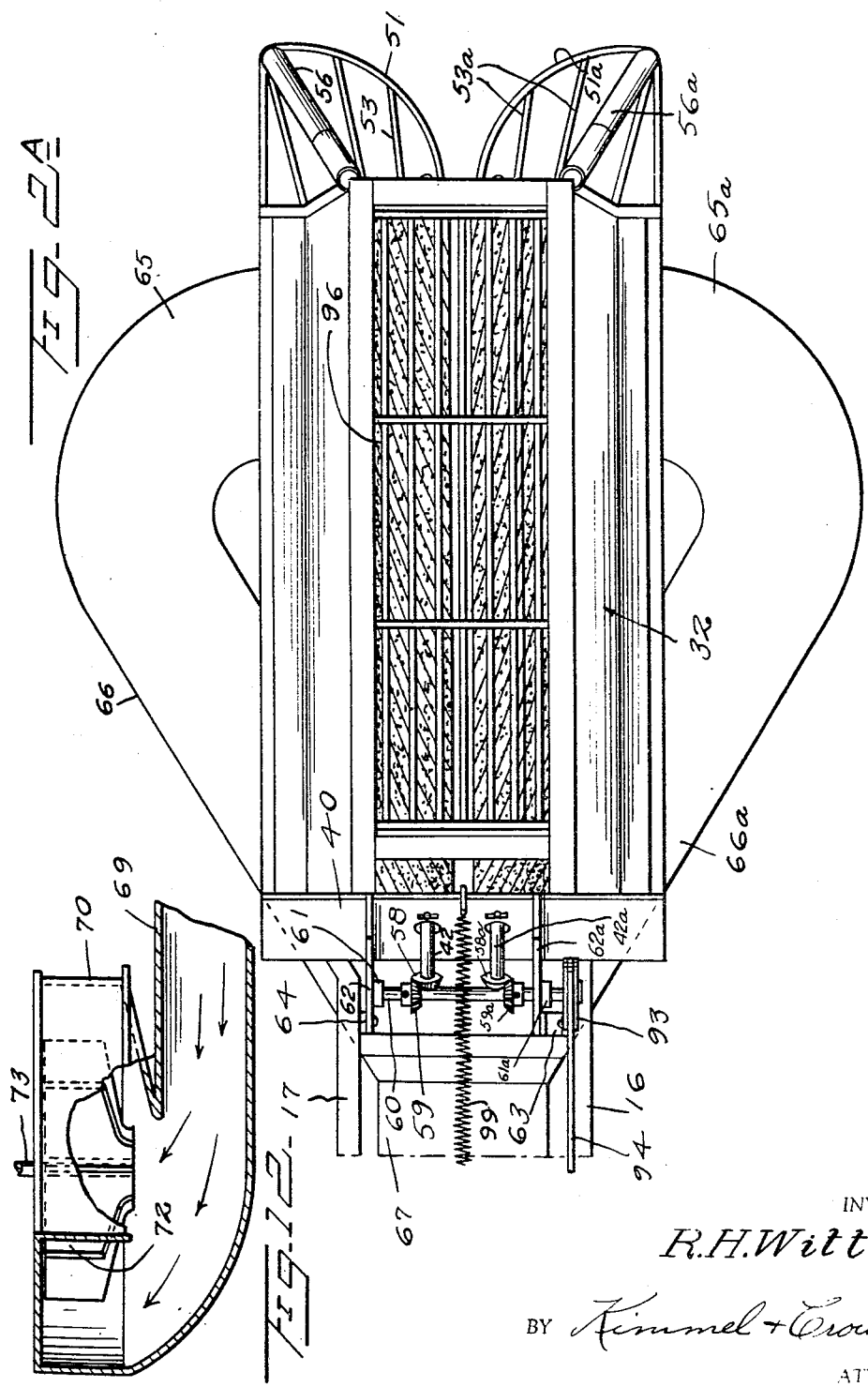
INVENTOR
R.H.Witt
BY Kimmel + Crowell
ATTORNEYS

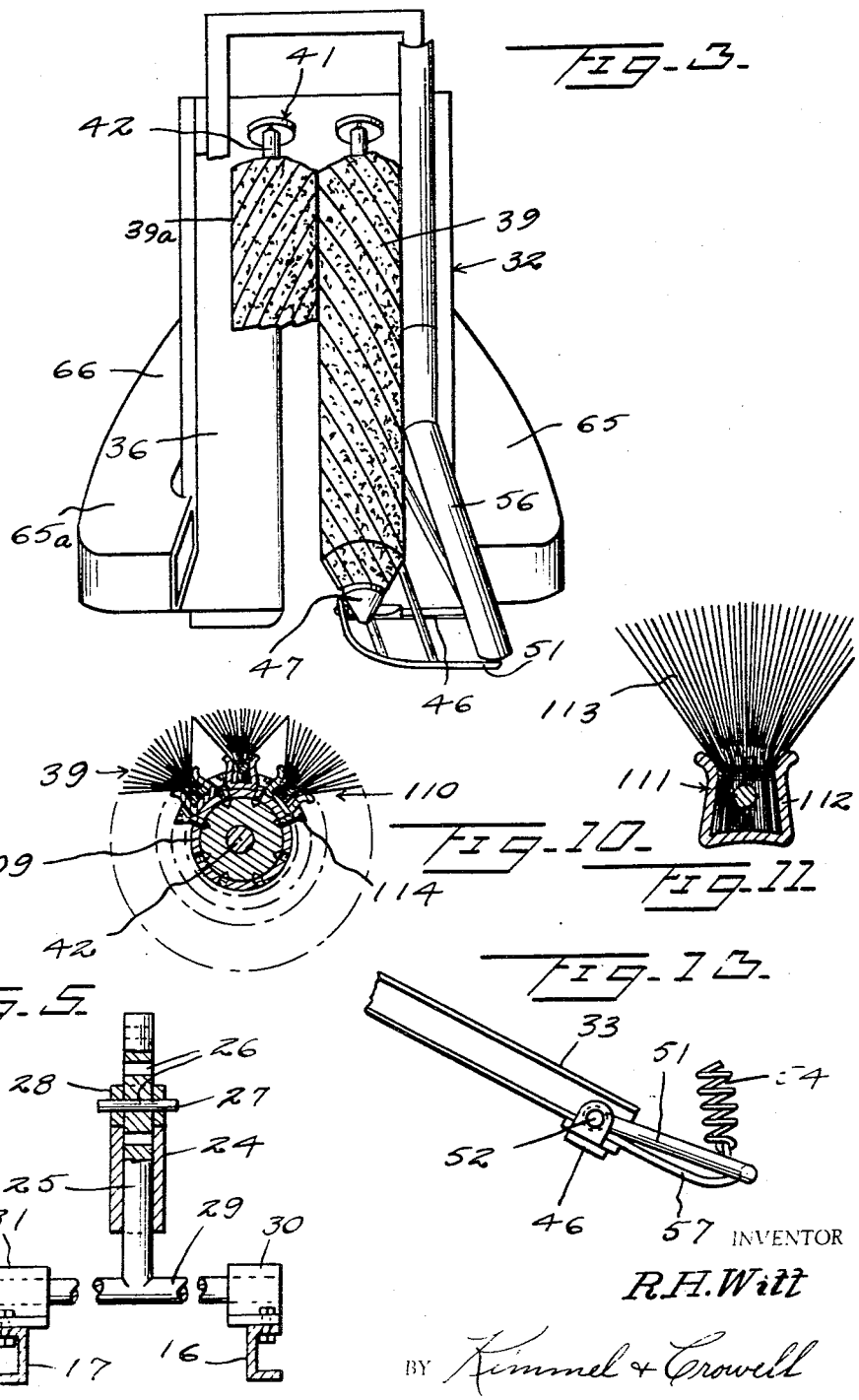

Aug. 28, 1956 R. H. WITT 2,760,325
COTTON STRIPPER WITH PNEUMATIC CONVEYING MEANS
Filed Dec. 18, 1953 5 Sheets-Sheet 5
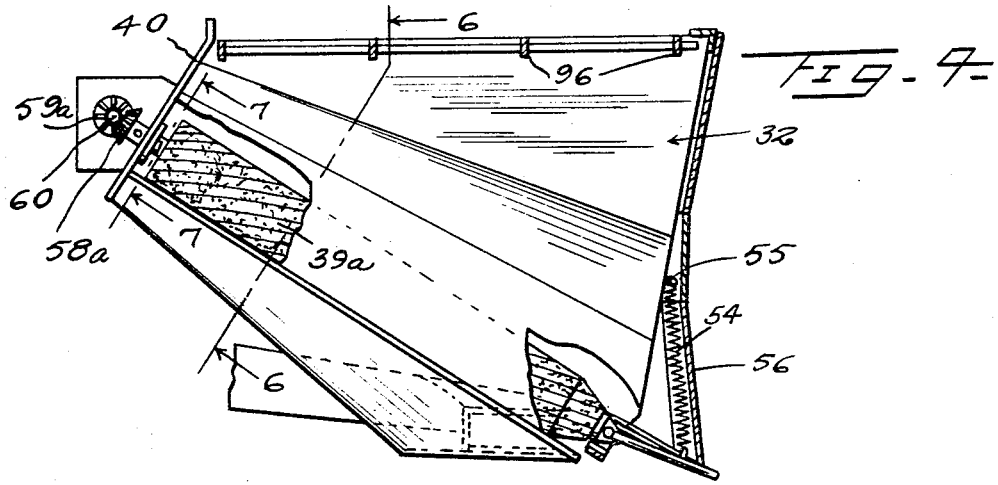
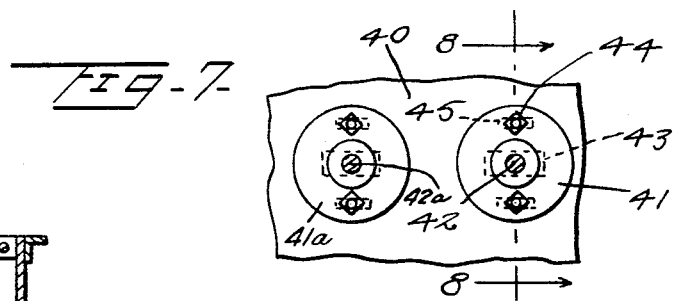
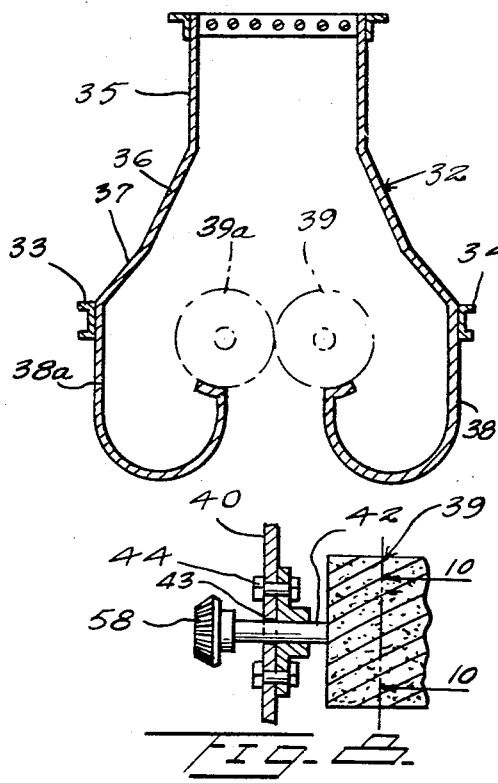
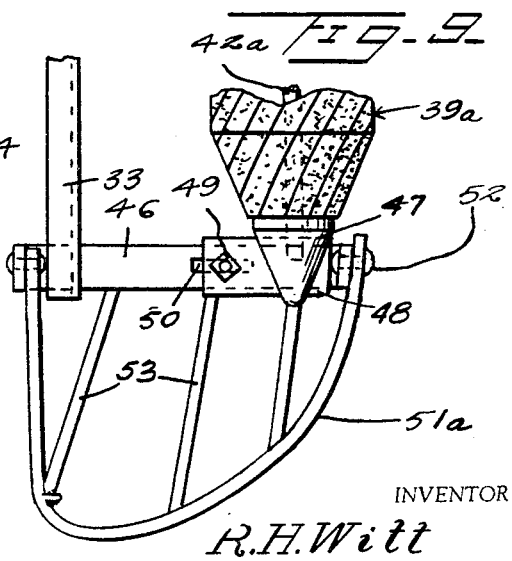
INVENTOR
R. H. Witt
BY Kimmel + Crowell
ATTORNEYS

United States Patent Office 2,760,325
Patented Aug. 28, 1956

2,760,325

COTTON STRIPPER WITH PNEUMATIC CONVEYING MEANS

Robert H. Witt, Royal Oak, Mich., assignor to Board of Regents of the Oklahoma Agricultural and Mechanical Colleges Application December 18, 1953, Serial No. 399,040

4 Claims. (Cl. 56—12)

The present invention relates to harvesting implements and more particularly to cotton harvesting machinery, and is a continuation in part of my copending application Serial No. 146,477 filed February 27, 1950, now abandoned, for Cotton Harvesting Machinery. While the present invention is a one-row machine with particular application to a row crop tractor, it will be understood that the principles embodied in this invention may be adapted to a multiple row machine that is either self-propelled, or power take-off driven from other types of tractors.

In connection with the development of improved cotton harvesting machinery, there are several important field and plant conditions which must be considered. In fields, plants vary greatly in size and diameter of stalk. This plant characteristic is most pronounced where there are skips in the plant row. The plants on either end of the skip are usually very large diametered as compared to the average stalk in the field. Variation in soil moisture effects variation in stalk diameter and size. Prior machines are not self-adjusting to this variation in stalk diameters and plant size, and large diametered stalks are frequently pulled and twigs and branches are broken from the plant. Pulled stalks results in field stoppages of the machine. Limbs and stalks are difficult to remove in ginning, cause excess wear on gin machinery, and result in an excessive amount of sticks in the cotton seed that has been ginned from seed cotton which contained branches and stalks.

Severe frosts kill the cotton plants and the branches become very brittle. Brittle branches break from the stalk when bent sharply or when pulled through restricted areas. It is the object of this invention to provide a machine which adjusts itself to the stalk diameter and size, a machine which harvests the cotton without undue harshness and without bending branches to the extremes which would break them.

With the above described conditions in mind, the principal objects of the present invention are the provision of a cotton harvesting machine with a stripping and picking means consisting of two parallel rollers inclined forwardly and downwardly, revolving in opposite directions with provisions to constrain cotton stalks to passage between said rollers, each of said rollers being equipped with a plurality of detachable brushes, and each brush consisting of brush fiber set in a channelled backing strip.

In consideration of the following described cooperative functions of the metal rollers, said brushes, the arrangement and placement of the component parts of said stripping and picking means with respect to one another within certain critical limits is necessary in order that said functions may be performed to a successful end. The displaceable brush area between component rollers being at its minimum width greater than the diameter of the larger stalks to be harvested, said displaceable brush area will have a maximum width equal to that of a large mature boll, in order that in the harvesting process every mature boll will be subjected to the combined beating and stripping action of said metal rolls and brushes in cooperation with the sweeping, brushing, and picking action of said brushes.

Since the stripping means has such unique stripping features that the said means provide the conveying means with seed cotton with very small amounts of limbs and twigs, all mechanism to break stalks and limbs has been eliminated, and a simplified conveying system with one moving part, is employed in this invention. Inclined chutes outside the stripping means guide the harvested cotton from the stripping means into the fast moving conveying air stream which cooperates with the stripping means to do better harvesting, keeping the stripping means free of harvested cotton. The conveying means is uniquely constructed so that the conveyed cotton passes without interruption directly from the inlet duct adjacent the stripping means through the fan outlet with little change in direction and without direct contact with the conveying fan. The kinetic energy of the fast moving cotton moves it from the inlet duct which leads into the fan housing past the front of fan into the fan outlet.

Another feature of the present invention resides in the provision of means which provide free lateral and vertical movement of the stripping means, said means to be centered accurately over the row, by the cotton plants in the row. This novel arrangement is such that if the machine is not centered over the row, the guide means will, when contacting the plants, center the stripping means over the row so that the movement of plants through the machine will be through the pre-determined passage between stripping means.

A further object of the present invention resides in the provision of an adjustment means for controlling the inclination of the stripping means. Increasing the inclination of the stripping means results in greater effective height of the stripping means. Thus the machine may be adjusted to accommodate plants of different heights.

These and other objects of the present invention will be apparent from the following description of the preferred structure taken in conjunction with the accompanying drawings illustrating said structure.

In the drawings:

Figure 1 is a detailed side elevation of a cotton harvester attachment for a tractor constructed according to an embodiment of this invention.

Figure 1a is a detailed side elevation, partly broken away, showing a discharge spout.

Figure 1b is a plan view of the discharge spout.

Figure 2 is an enlarged fragmentary plan view, partly in section, taken on the line 2—2 of Figure 1.

Figure 2a is an enlarged fragmentary plan view taken on the line 2a—2a of Figure 1.

Figure 3 is a detailed front elevation, partly broken away, of the machine.

Figure 4 is an enlarged fragmentary side elevation, partly broken away and in section, of the forward end of the machine.

Figure 5 is an end elevation, partly broken away, of the frame supporting means shown partly in section.

Figure 6 is an enlarged sectional view taken on the line 6—6 of Figure 4.

Figure 7 is an enlarged fragmentary sectional view taken on the line 7—7 of Figure 4.

Figure 8 is an enlarged fragmentary sectional view taken on the line 8—8 of Figure 7.

Figure 9 is an enlarged fragmentary plan view on an enlarged scale of the forward end of the device.

Figure 10 is an enlarged elevational view with parts broken away and shown in section of one of the picking brushes.

Figure 11 is an enlarged view of a portion of the brush shown in Figure 10.

Figure 12 is an enlarged fragmentary sectional view taken on the line 12—12 of Figure 1.

Figure 13 is an enlarged fragmentary side elevation showing the forward end of the picking structure.

Referring to the drawings, the numeral 15 designates generally a frame structure which is formed of opposite side channel bars 16 and 17 connected together by connecting bars 18 and 19. The frame structure 15 is adapted to be supported from the axle of a tractor between the body of the tractor and a rear wheel.

A clamping body 20 having a pair of pivoted arms 21 and 22, which are drawn together by means of a clamping loop 23, is adapted to engage an axle housing of the tractor. The configuration of the body 20 and the arms 21 and 22 is coincident with the configuration of the particular axle.

The rear of the body 20 has a vertically disposed bushing 24 secured thereto, and a vertical shaft 25 loosely engages in the bushing 24. The shaft 25 is provided with a series of vertically spaced apart openings 26, and a pin 27 engaging through a thrust collar 28 is disposed through a selected one of the openings 26 with the collar 28 bearing against the upper end of the bushing 24.

A horizontal shaft 29 is fixed to the lower end of shaft 25, and is rotatably disposed in bearings 30 and 31 which are fixed to the frame bars 16 and 17 respectively.

A downwardly and forwardly inclined suction housing, generally indicated at 32, is secured to a pair of downwardly and forwardly inclined channel bars 33 and 34, with the channel bars 33 and 34 fixed to the forward ends of the frame bars 16 and 17 respectively.

The housing 32 is formed with upper vertical parallel walls 35, and with obtusely related walls 36 and 37. A pair of laterally offset chutes 38 and 38a having open inner sides extend from the walls 37 and 37a, and the chutes 38 and 38a are offset laterally from an adjacent combined brush and roller 39 and 39a. There are two of these brush and rollers 39 and 39a which are disposed in parallel relation and are inclined downwardly and forwardly.

The housing 32 is formed with a rear wall or plate 40 which provides a support for laterally adjustable bearings 41 and 41a through which the roller or brush shafts 42 and 42a are rotatably disposed.

As shown in Figure 7, the plate 40 is provided with a horizontal elongated slot 43 through which the shaft 42 is disposed, and the bearing 41 is secured in laterally adjusted position by means of bolts 44 engaging through horizontal elongated slots 45 formed in plate 40.

The housing supporting bars 33 and 34 have secured to the forward lower ends thereof an inwardly projecting roller supporting bar 46. A substantial conical bearing 47 is fixed to a base plate 48 which is secured to bar 46 by means of bolts 49. Bolts 49 extend through elongated slots 50 which are formed in supporting bar 46 so that bearing 47 with base plate 48 may be horizontally adjusted so that the two pick-up members or brushes 39 and 39a may be adjusted toward or away from each other.

A substantially U-shaped pick-up bar or guard 51a is rockably mounted on pivot members 52 carried by bar 46, and bar 51a is provided with a plurality of rearwardly projecting fingers 53a. A spring 54 is secured at one end to the outer portion of bar 51 and extends upwardly and is secured to an adjacent intermediate portion of the housing 32, as indicated at 55. A second U-shaped pickup bar or guard 51 provided with fingers 53a is mounted in the same relationship to roller 39 as bar or guard 51a relates to roller 39a.

A transversely arcuate shield 56a engages about the spring 54 so that no cotton branches or leaves will adhere to the spring 54. A second shield 56 covers a similar spring (not shown). The bars 51 and 51a are each provided with a shoe 57 which may contact and ride over the ground so that bars 51 and 51a will be disposed closely adjacent to the ground at all times.

Shaft 42 has a beveled gear 58 fixed to the rear upper end thereof which meshes with a beveled gear 59 mounted on a shaft 60. The gear 59 is laterally adjustable on the shaft 60 so that the gears 58 and 59 will be in constant mesh with each other when the shaft 42 is laterally adjusted.

Shaft 42a has a beveled gear 58a fixed to the rear upper end thereof which meshes with a beveled gear 59a mounted on shaft 60. The gear 59a is laterally adjustable on the shaft 60, so that gears 58a and 59a will be in constant mesh with each other when the shaft 42a is laterally adjusted.

The shaft 60 rotatably engages in bearings 61 carried by rearwardly projecting plates 62 which extend from plate 40, and supporting bars 63 and 64 are secured to plates 62 and to the frame members 16 and 17 respectively.

The suction housing 32 has connected with the lower forward portion thereof and on opposite sides thereof intake ends of arcuate suction ducts 65 and 65a which are formed with rearwardly and inwardly converging projecting rear portions 66 and 66a. The two rear portions 66 and 66a converge rearwardly and are connected with a common duct 67 which is connected by means of a detachable connector or coupling 68 to an upwardly and rearwardly inclined duct 69.

The duct 69 is connected with the intake side of a suction fan 70, as shown in Figure 12, and the rear end of duct 69 communicates with a portion of the outlet or pressure side 71 of fan housing 70 so that the cotton and other material will not come into direct contact with the rotating fan blades 72.

The fan blades 72 are secured to a shaft 73 which is journalled in a bearing 74 supported by supporting means 75. An upwardly projecting pipe 76 is connected to the discharge member 71 of fan housing 70, and a longitudinally bent spout 77 extends from the pipe 76 and is formed with a hinged discharge member 78.

The spout 77 and the discharge member 78, as shown in Figure 1b, are provided with grills 79 and 79a, respectively, in the upper sides thereof so that the fine particles of leaves, branches, or the like, may be blown out into the atmosphere and the cotton will pass through the discharge member 78.

The discharge member 78 is provided with an upwardly projecting arm 80 having a flexible member 81 connected thereto so that discharge member 78 may be vertically rocked on the hinge connection 82 to provide for proper discharge of the material into the receiver.

A drive shaft 83 is journalled in bearing 84 carried by the frame 15, and is adapted to be connected to the power takeoff, or other source of power supply.

Shaft 88 has fixed thereon a grooved pulley 87. Shaft 88 is journalled in a bearing 89 secured to the fan housing 70, and the opposite end of shaft 88 has fixed thereon a grooved wheel or pulley 90.

Shaft 73 has fixed thereon a grooved pulley 91, and a belt 92 engages about pulleys 90 and 91. Shaft 60 has fixed to one end thereof a grooved pulley 93 about which a belt 94 engages, and belt 94 engages about a second grooved pulley 95 which is fixed to drive shaft 83.

The housing 32 has fixed thereto a grill 96 which will admit air to the upper portion of the housing 32.

In order to provide a means whereby the frame structure 15 may be vertically rocked relative to the tractor, I have provided a hand lever 97 which engages a toothed quadrant 98 fixed to the stationary body 20. A spring 99 is connected between hand lever 97 and the rear portion of housing 32, as shown in Figure 1.

The frame 15 is substantially counter-balanced in adjusted position by means of a pair of springs 100 which are connected at their forward ends to the quadrant 98 and are connected at their rear ends to lugs 101 fixed relative to the fan housing 70. Fan housing 70 is carried by a supporting frame structure 102 which is formed with side plates 103 and 104 engaging the upper sides of the frame bars 16 and 17.

The plates 103 and 104 are provided with elongated openings 105 and 106 respectively, and bolts 107 and 108 adjustably secure the plates 103 and 104 respectively, relative to the length of the frame bars 16 and 17.

In the use and operation of this harvester, the frame structure 15 is secured to the axle housing of a tractor between one wheel and the body of the tractor by the clamping means 20, 21, 22, and 23.

The shaft 25, which engages through the bushing or bearing 24 of body 20, provides a means whereby the frame structure 15 may horizontally swing so that when the tractor is moving forwardly along a row of plants the frame structure 15, with the lift and guide members 51, 51a, will horizontally swing so that the plants will not be injured or broken in the event that the plants are not in a straight line, or the tractor partially shifts with respect to the row of plants.

The brushes and rollers 39 and 39a rotate in opposite directions so as to pull the bolls and leaves from the branches and stalks of the cotton plants, and the cotton and other material removed from the plants is thrown laterally into the downwardly and forwardly inclined chutes 38 and 38a.

The suction caused by the fan blades 72 will form a draft of air entering the intake ends of the suction members 65 and 65a which will draw the cotton and other materials into the suction members 65 and 65a and then rearwardly into the fan housing 70.

The cotton and other material will then be forced upwardly to the discharge member and fan housing 70 and will then be forced outwardly to the spouts 77—78. The forward or leading end of the harvester may be vertically adjusted by the hand lever 97 so that the brushes will come into contact with the cotton bolls at different heights on the plants.

Each brush and roller 39, 39a is formed of a cylindrical roller body 109 on the periphery of which are spirally mounted a plurality of brush members 110, each brush member 110 is formed of channels 111 having downwardly divergent side walls 112 and a plurality of bristles 113 firmly secured in the walls 112.

The downwardly divergent walls 112 of the channels 111 form a wedging means engageable by tapered fastening members 114 which are threaded into the roller 109 so that the channel members or backs 111 will be firmly secured to the roller 109.

What is claimed is:

1. A cotton harvester for mounting on a tractor comprising an elongated substantially horizontal frame having forward and rear ends, means attached to said frame for pivotally securing said frame to a tractor axle, a forwardly opening suction housing carried by the forward end of said frame, said housing having a pair of upper vertical walls having lower edges, obtusely inclined intermediate walls having lower edges, said intermediate walls being attached to and extending from the lower edges of said upper walls, a laterally offset chute attached to and extending from the lower edge of each of said intermediate walls, said chutes each having forward and rear ends and having open inner sides, said chutes inclining downwardly and forwardly whereby material will gravitate toward the forward ends thereof, a pair of suction ducts having intake ends connected to the forward ends of said chutes, said ducts converging rearwardly, a suction fan mounted on said frame, a suction pipe having one of its ends connected to said ducts at the end opposite said intake end and the other end connected to said suction fan, a pair of downwardly and forwardly inclined stripping members rotatably carried by said housing and confronting the inner open sides of said chutes, and means mounted on said frame for rotating said stripping members in opposite directions.

2. A cotton harvester for mounting on a tractor comprising an elongated substantially horizontal frame having forward and rear ends, means attached to said frame for pivotally securing said frame to a tractor axle, said pivot means including right angularly related integral shafts, an axle clamping body, a vertical bearing carried by said body in which one of said shafts loosely engages, a pair of bearings carried by said frame in which the other of said shaft loosely engages, a forwardly opening suction housing carried by the forward end of said frame, said housing having a pair of upper vertical walls having lower edges, obtusely inclined intermediate walls having lower edges, said intermediate walls being attached to and extending from the lower edges of said upper walls, a laterally offset chute attached to and extending from the lower edge of each of said intermediate walls, said chutes each having forward and rear ends and open inner sides, said chutes inclining downwardly and forwardly whereby material will gravitate toward the forward ends thereof, a pair of suction ducts having intake ends connected to the forward ends of said chutes, said ducts converging rearwardly, a suction fan mounted on said frame, a suction pipe having one of its ends connected to said ducts at the end opposite said intake end and the other end connected to said suction fan, a pair of downwardly and forwardly inclined stripping members rotatably carried by said housing and confronting the inner open sides of said chutes, and means mounted on said frame for rotating said stripping members in opposite directions.

3. A cotton harvester for mounting on a tractor comprising an elongated substantially horizontal frame having forward and rear ends, means attached to said frame for pivotally securing said frame to a tractor axle, said pivot means including right angularly related shafts, an axle clamping body, a vertical bearing carried by said body in which one of said shafts loosely engages, a pair of bearings carried by said frame in which the other of said shafts loosely engages, a forwardly opening suction housing carried by the forward end of said frame, said housing having a pair of upper vertical walls having lower edges, obtusely inclined intermediate walls having lower edges, said intermediate walls being attached to and extending from the lower edges of said upper walls, a laterally offset chute attached to and extending from the lower edge of each of said intermediate walls, said chutes each having forward and rear ends and open inner sides, said chutes inclining downwardly and forwardly whereby material will gravitate toward the forward ends thereof, a pair of suction ducts having intake ends connected to the forward ends of said chutes, said ducts converging rearwardly, a suction fan mounted on said frame, a suction pipe having one of its ends connected to said ducts at the end opposite side intake end and the other end connected to said suction fan, a pair of downwardly and forwardly inclined stripping members rotatably carried by said housing and confronting the inner open sides of said chutes, means mounted on said frame for rotating said stripping members in opposite directions, and means on said frame adjustably counterbalancing said frame relative to the ground.

4. A cotton harvester for mounting on a tractor comprising an elongated substantially horizontal frame having forward and rear ends, means attached to said frame for pivotally securing said frame to a tractor axle, said pivot means including right angularly related integral shafts, an axle clamping body, a vertical bearing carried by said body in which one of said shafts loosely engages, a pair of bearings carried by said frame in which the other of said shafts loosely engages, a forwardly opening suction housing carried by the forward end of said frame, said housing having a pair of upper vertical walls having lower edges, obtusely inclined intermediate walls having lower edges, said intermediate walls being attached to and extending from the lower edges of said upper walls, a laterally offset chute attached to and extending from the lower edge of each of said intermediate walls, said chutes each having forward and rear ends and having open inner sides, said chutes inclining downwardly and forwardly whereby material will gravitate toward the forward ends thereof, a pair of suction ducts having intake ends connected to the forward ends of said chutes, said ducts converging rearwardly, a suction fan mounted on said frame, a suction pipe having one of its ends connected to said ducts at the ends opposite said intake ends and the other end connected to said suction fan, a pair of downwardly and forwardly inclined stripping members rotatably carried by said housing and confronting the inner open sides of said chutes, means mounted on said frame for rotating said stripping members in opposite directions, means on said frame adjustably counterbalancing said frame relative to the ground, and forwardly divergent guide means carried by said housing whereby said frame will horizontally swing about the other of said shafts on engagement of the plant stalks with said guide means.

References Cited in the file of this patent
UNITED STATES PATENTS

| | | |
|---|---|---|
| 1,722,747 | Hentz | July 30, 1929 |
| 2,445,162 | Wallace | July 13, 1940 |
| 2,401,152 | Hagen | May 28, 1946 |
| 2,406,058 | Boone | Aug. 20, 1946 |
| 2,493,422 | Sartin | Jan. 3, 1950 |
| 2,514,519 | Ryan | July 11, 1950 |
| 2,538,166 | Roscoe et al. | Jan. 16, 1951 |